Patented June 26, 1951

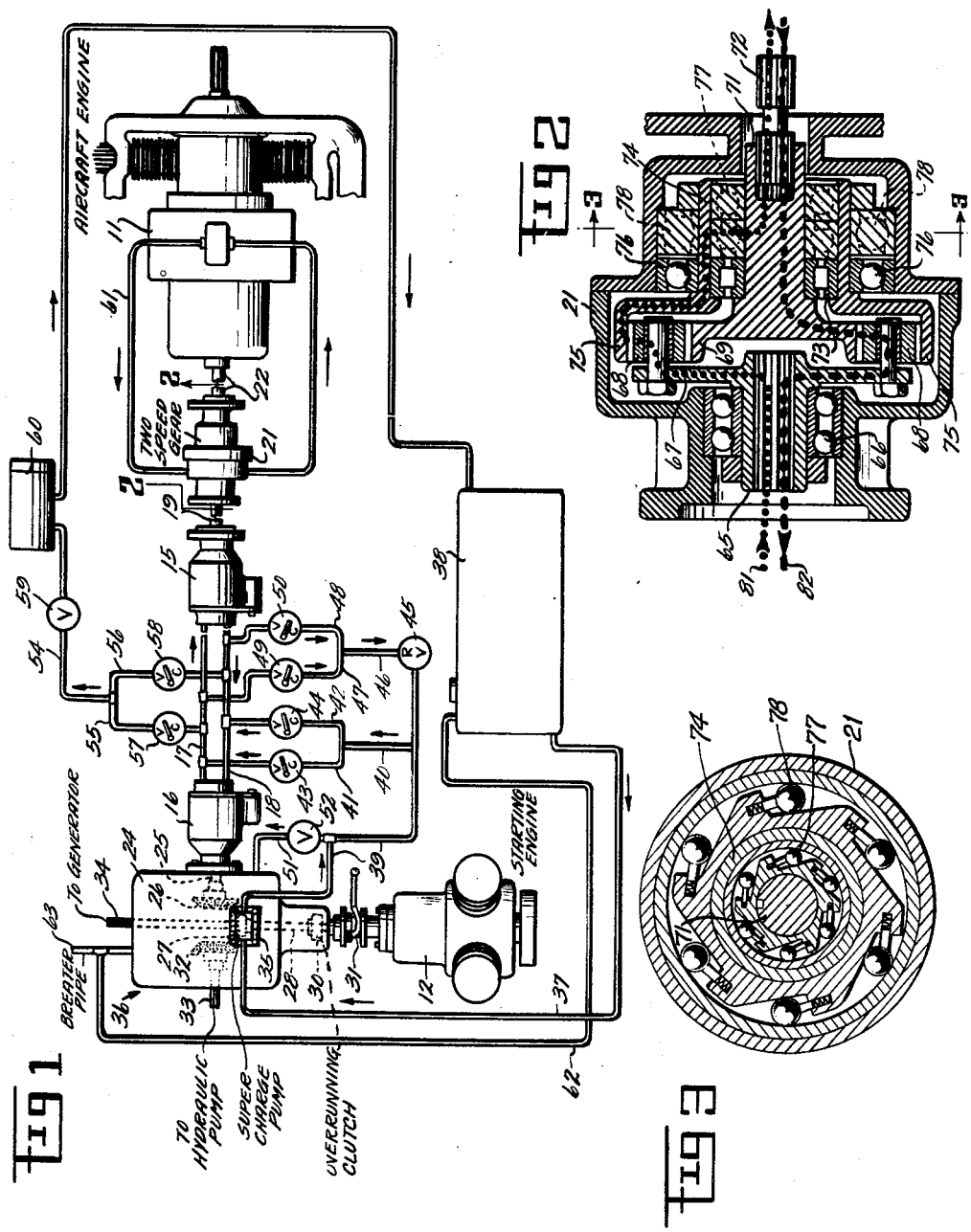

2,557,933

UNITED STATES PATENT OFFICE 2,557,933

MAIN AND STARTING ENGINE WITH GEAR AND HYDRAULIC ACCESSORY DRIVE SYSTEM

Bernard Beaman, Robert A. Stein, and Julius Hulman, Dayton, Ohio

Application September 23, 1946, Serial No. 698,596.

6 Claims. (Cl. 60—97)

(Granted under the act of March 3, 1883, as amended April 30, 1928; 370 O. G. 757)

The invention described herein may be manufactured and used by or for the Government for governmental purposes without payment to us of any royalty thereon.

This invention relates to an improved system which functions both as an aircraft engine starting system and also as a constant speed, remote driven gear-actuated accessory drive system.

In aviation it is customary to drive accessories, such as the electric generator, the hydraulic pump and the air and fuel pumps, the governor and the like, by connecting the main driving engine directly with these accessories, or with a gear mechanism which includes the necessary number of drives for actuating such accessories. Heretofore, with such an arrangement, a starting engine or an auxiliary engine has been incorporated, but that is essentially utilized for starting the main driving engine. Moreover, when in such apparatus either the main engine or the hydraulic connection between said main engine and the accessories driving gear mechanism becomes defective, especially where said mechanism is mounted remote from said engine, to allow for the distribution of weight evenly throughout the airplane, then no driving means is present for automatically taking up and continuing the driving of those accessories.

It is an essential object of this invention to provide an improved engine starting and accessories driving system wherein the starting engine and the accessories drive and its hydraulic connections with said main driving engine are utilized, not only for starting the main engine, but also after starting it; and these hydraulic accessories driving connections are furthermore operative for taking power from the main engine under normal conditions for the operation of said accessories, and then, in the event that the main engine or the hydraulic driving connections fail to function, said starting engine will become effective for driving these accessories.

Another object of this invention is to provide in such a system a hydraulic transmission between the main driving engine and the associated accessories, so that the accessories can be located remote from the main engine to provide for proper distribution of the weight to the best advantage throughout the airplane.

Another object of this invention is to provide such a system including a starting engine and a gear box with accessories connected by hydraulic transmission and a two-speed gear with the main engine, wherein the connections are arranged so that the starting engine will automatically and instantaneously pick up the gear box load in the event of failure of the hydraulic transmission system.

Another object of this invention is to provide such a system of simplified design whereby to reduce fluid friction losses of the rotating parts, and preferably doing so by mounting one or more of the driving members of the assembly of accessories inside the gear box or housing, and furthermore utilizing a single liquid for the hydraulic transmission system and likewise for the lubrication of the gear box bearings and gears.

These and various other objects and advantages are attained with this invention, as will become apparent from the following description, taken in connection with the accompaying drawing wherein the invention is shown in its preferred form, it being evident that other arrangements and forms of construction may be resorted to in carrying out the objects and purposes of this invention.

In the drawing:

Fig. 1 is a diagrammatic view illustrating our invention applied to a main aircraft engine and its starting engine.

Fig. 2 is a sectional view, taken at 2—2 of Fig. 1, of the two-speed, two-way gear which is interposed between the main engine and the hydraulic driving connections.

Fig. 3 is a sectional view taken at 3—3 of Fig. 2, through two of the overrunning clutches.

Our novel engine starting and accessories driving system consists substantially of a specialized form of hydraulic system which is used in conjunction with a main engine or airplane driving engine 11, a starting engine 12 for said main engine, and an assembly of accessories being operatively connected with said engines by means of this driving system.

Our novel starting and driving system comprising a pair of pumps 15 and 16 which are operatively connected by a pair of hydraulic conduits 17 and 18.

The pump 15 is connected through a shaft 19 to a gear means 21 which is connected through a shaft 22 to the main engine 11. Pump 16 is mounted on a gear housing or gear box 24, and the shaft 25 extending from the pump carries a bevel gear 26 thereon located inside said housing 24 and meshing with a gear 27 secured on a shaft 28 which is operatively connected with the starting engine 12 through an overrunning clutch 30 and a throw-out clutch 31. Said gear 27 drives a gear 32 having a shaft 33 thereon arranged and adapted for driving a hydraulic pump (not shown); and said gear also drives a shaft 34 extending from the gear housing and arranged for driving a generator (not shown), or the like. Said gear 27 furthermore drives a supercharging pump 35. These gears and shafts 26 to 34 with said housing 24 therearound provide the gear mechanism 36 which is utilized herein for driving the various accessories of this assembly.

The pump 16 is preferably a variable displacement pump, while the pump 15 may be fixed displacement or variable displacement. The use of a variable displacement pump permits control of the speed and the torque ratios of the two pumps.

The supercharging pump 35 is preferably mounted in the gear housing 24, to facilitate its necessary lubrication, and it is adapted to provide the needed pressure to the oil in the system as well as in the gear housing. Said pump is connected by a conduit 37 with a reservoir 38 which is of suitable capacity for maintaining the necessary hydraulic fluid in the system. A feed conduit 39 extends from this pump 35 and has connected thereto a feed conduit 40 which includes branches 41 and 42 connected to the conduits 17 and 18, respectively, while check valves 43 and 44 are interposed in said branches 41 and 42, respectively. Said feed conduit 39 also has a relief valve 45 mounted therein and is connected by a return conduit 46 and two branches 47 and 48 thereon with the conduits 17 and 18, respectively, while check valves 49 and 50 are included in said branches 47 and 48. A pipe 51 also extends from conduit 39 into the gear housing 24 and it has a restrictive flow valve or control valve 52 interposed therein which can be adjusted and utilized to provide the pressure control for the oil used in lubricating said accessory gear housing itself.

A return conduit 54 includes two branches 55 and 56, which are connected to the main conduits 17 and 18, respectively. Said branches contain check valves 57 and 58 therein, and a control valve 59 is interposed in conduit 54 and is used for suitably controlling the low pressure of the system and maintaining constant supercharging pressure at the outlet side of the supercharging pump 35. Said conduit 54 is connected with the reservoir 38 to return the oil thereto, and it has an oil cooler 60 interposed therein for returning the oil or hydraulic fluid in a properly cooled condition to said reservoir.

A lubrication conductor 61 is connected with the interiors of the housing of engine 11 and of the housing of gear means 21, to provide free flow of lubrication therebetween.

A vent line 62 extends from the reservoir 38 and forms a junction with a breather pipe 63 which extends from the accessory gear housing 24.

The gear means 21 is a two-speed gear and is arranged to provide automatic two-speed ratio driving for this system, depending upon whether power is flowing into the driving engine 11, during starting, or away from said engine toward the accessories driving mechanism, during running of the engine and the system. As indicated in Fig. 2, this gear means 21 includes a tubular shaft or sleeve 65 arranged to receive therein the shaft 19 extending from pump 15, and said shaft 65 is mounted by anti-friction bearings 66 in the housing of gear means 21. A radial flange 67 on the inward end of said shaft 65 carries a set of pinions 68 thereon which mesh with a spur gear 69 provided on the inner end of a shaft 71 which carries on its outer end a splined stud 72 arranged to be connected to the shaft 22 of the main engine 11. Said shaft 71 is rotatably mounted by rollers 73 in the sleeve part 74 of a ring gear 75 which meshes with said pinions 68, said sleeve part 74 being rotary in ball bearings 76 in the housing of gear means 21. Overrunning clutches 77 are provided between shaft 71 and sleeve 74, and these clutches lock the shaft 71 and sleeve 74 together for combined rotation, along with the rotation of tubular shaft 65, when the starting engine 12 and the shaft 19 drive said gear means 21 along the path of dotted line 81, for starting the main engine. Overrunning clutches 78 are furthermore provided between sleeve 74 and the gear housing, so as to lock said sleeve within the housing and block its rotation when the main engine 11 and said shaft 22 drive the gear shaft 71 and therewith rotate the set of pinions 68 so as to travel around the interior of the ring gear 75 which is then held stationary, and thereby rotate and drive flange 67 with the tubular shaft 65 along the path of dash line 82, and thus drive the connected shaft 19 and pump 15.

The gear ratio in this gear means 21 is so arranged that when during starting the power is transmitted from the starting engine 12 through the gear mechanism 24 and the pumps 16 and 15 and through shaft 19 and gear 21 to the main engine 11, a speed ratio of 1 to 1 will result, and when during running of the system the power is transmitted from the main engine 11 through shafts 22 and 71, through the rotating gear means to the tubular shaft 65 and thereby to shaft 19 and pump 15, the gear ratio will be such that a speed reduction of substantially 1.73 to 1 will result. Thus, when this gear is driven through shaft 65 at 3400 R. P. M., then shaft 71 will also travel at the same speed, but when shaft 71 drives at 6939 R. P. M., then shaft 65 is driven at 4000 R. P. M.

During operation, the starting engine 12 is started and is brought up to speed, while the throw-out clutch 31 is open. Said starting engine is governed to a speed lower than the lowest normal running speed of the gear mechanism when the main engine is operating. The clutch 31 is then closed whereupon the gear mechanism 36 is driven, thereby actuating pump 16 which now acts as a pump to force fluid through conduit 17 for driving pump 15, causing the latter to act as a motor and driving the gear means 21 along the path and in the direction of dotted line and arrow 81, thereby starting the main engine 11. When the main engine then reaches its required speed, it begins to drive the gear 21 along the path and in the direction of dash line and arrow 82, and thereby drives the pump 15 which thereupon acts as a pump and pumps back through conduit 18 into pump 16 which then acts as a motor and drives the gear mechanism 36 with its accessories. The gear mechanism is now driven at a greater speed than the governed speed of the starting engine 12, and the overruning clutch 30 thereupon unloads said starting engine, which now continues to run at its governed speed without any load. Consequently, it should be noted, that in the event of failure of the hydraulic transmission including pumps 15 and 16, or of the main engine 11, the starting engine will pick up the load of the gear mechanism 36 and will again drive the assembly of accessories. Furthermore, this construction and arrangement enables the positioning of the accessories remote from the main engine and thereby facilitates the advantageous distribution of weight throughout the airplane. Inasmuch as the devices 15 and 16 operate part of the time as hydraulic motors and part of the time as hydraulic pumps, they may, in some of the claims, be referred to as motor-pumps.

We claim:

1. An apparatus of the character described, which comprises a main engine, a speed-changing gear-set drivably attached to said main engine, a motor-pump drivably attached to said speed-changing gear-set, an auxiliary engine, an accessory-driving gear-set drivably connected to said auxiliary engine, an overrunning clutch interposed in the drive between said auxiliary-engine and said accessory-driving gear-set, whereby said accessory-driving gear-set may overrun said auxiliary engine, a second motor-pump drivably attached to said accessory-driving gear-set, the two said motor pumps being located one remote from the other, and piping connecting the suction side of one motor-pump to the discharge side of the other, the first said motor-pump being operative as a pump and the said second motor pump being operative as a motor when the main engine is driving, and the said second motor-pump being operative as a pump and the first said motor-pump being operative as a motor when the auxiliary engine is driving.

2. The device defined in claim 1 with a manually operable friction clutch interposed in the drive between the auxiliary engine and the overrunning clutch.

3. The device of claim 1, with a pump and tank for hydraulic fluid and additional piping connecting the discharge side of the pump to the first said piping for maintaining the hydraulic fluid in the system under pressure.

4. The device defined in claim 3 wherein one of the motor-pumps is of variable output, whereby the speed ratio of the one acting as a pump and the other acting as a motor may be varied.

5. A device of the character described, comprising, in combination, a main engine, an auxiliary engine, an accessory drive gearset, a one-way driving member connecting said auxiliary engine to said accessory drive gearset, whereby said accessory drive gearset may overrun said auxiliary engine, a speed changing gear drivably connected to said main engine, a motor pump drivably attached to said speed changing gear, a second motor pump drivably attached to said accessory drive gearset, conduits connecting the low and high side of either pump to the high and low side respectively of the other, a supercharging pump, and piping connecting said supercharging pump to said conduits for maintaining a predetermined pressure in said motor pumps and conduits.

6. The structure defined in claim 5 with speed change gearing so proportioned and arranged that when the starting engine drives the main engine, the ratio through the speed changing gear is one to one, but when the main engine drives the accessory drive gear set, the accessory drive gearset will be driven at a reduced ratio.

BERNARD BEAMAN.
ROBERT A. STEIN.
JULIUS HULMAN.

REFERENCES CITED

The following references are of record in the file of this patent:

UNITED STATES PATENTS

| Number | Name | Date |
|---|---|---|
| 2,195,139 | Waseige | Mar. 26, 1940 |
| 2,349,334 | Armentrout | May 23, 1944 |